(12) United States Patent
Yasuda

(10) Patent No.: US 6,937,817 B2
(45) Date of Patent: Aug. 30, 2005

(54) CAMERA INCLUDING CAM MEMBER FOR INTERLOCKING IMAGE-TAKING OPTICAL SYSTEM AND VIEW FINDER OPTICAL SYSTEM OF THE CAMERA

(75) Inventor: Toshiyuki Yasuda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/784,575

(22) Filed: Feb. 23, 2004

(65) Prior Publication Data

US 2004/0165876 A1 Aug. 26, 2004

(30) Foreign Application Priority Data

Feb. 25, 2003 (JP) ........................................ 2003-047545

(51) Int. Cl.⁷ ............................................ G03B 13/10
(52) U.S. Cl. ......................... 396/84; 396/379; 348/341
(58) Field of Search .......................... 396/84, 379, 378; 348/341

(56) References Cited

U.S. PATENT DOCUMENTS

2001/0026685 A1 * 10/2001 Shimizu ...................... 396/379
2003/0107667 A1 * 6/2003 Abe et al. .................... 348/341

FOREIGN PATENT DOCUMENTS

JP       2001-324749       11/2001

* cited by examiner

Primary Examiner—David M. Gray
(74) Attorney, Agent, or Firm—Cowan, Liebowitz & Latman, P.C

(57) ABSTRACT

A camera which causes a lens unit to move accurately through a cam member is disclosed. The camera comprises a lens unit with movable lenses making up a view finder optical system, a cam member having a cam which engages with the lens unit for driving the lens unit in conjunction with the operation of the image-taking optical system, a first bias member which biases the cam member in one of moving directions of the cam member, and a second bias member which biases the lens unit so as to contact the cam surface.

7 Claims, 16 Drawing Sheets

CAMERA INCLUDING CAM MEMBER FOR INTERLOCKING IMAGE-TAKING OPTICAL SYSTEM AND VIEW FINDER OPTICAL SYSTEM OF THE CAMERA

BACKGROUND OF THE INVENTION

1. Field of the Invention

The present invention relates to a camera provided with a cam member for interlocking an image-taking optical system and a view finder optical system.

2. Description of the Related Art

A view finder optical system which is provided in a camera having a collapse type lens barrel is conventionally designed to interlock with a magnification-varying operation of an image-taking optical system and there are various types of the interlock mechanism; a type of driving a view finder optical system by a cam through a transmission member such as a gear train from a driving mechanism of the image-taking optical system or a type of driving a view finder optical system by an actuator different from the actuator for driving the image-taking optical system while detecting the focal length of the image-taking optical system.

However, in the interlock mechanism which drives the view finder optical system through the transmission member, the transmission member must be provided outside the lens barrel for structural reasons, therefore it is difficult to reduce the size of camera. Furthermore, in the interlock mechanism using a different actuator, the number of parts making up the driving mechanism of the image-taking optical system and the view finder optical system is increased, which constitutes major detrimental effects on not only miniaturization of the camera but also costs.

As means for solving these problems, there is a mechanism which interlocks an image-taking optical system and view finder optical system through a platy cam member (view finder cam plate) as disclosed in Japanese Patent Application Laid-Open No. 2001-324749. That is, this mechanism intends to reduce the number of parts and reduce the size of the camera by interlocking the image-taking optical system and view finder optical system using the platy view finder cam plate.

The view finder cam plate adopts a structure shown in FIG. 17. That is, a view finder cam plate 46 rotates around the optical axis (moves in the horizontal direction in FIG. 17) according to a magnification-varying operation of an image-taking optical system and lens holding members 56 and 57 which hold lenses making up the view finder optical system move in the direction of the optical axis (vertical direction in FIG. 17) through an engagement of follower portions 56a and 57a and cam groove portions 46c and 46d.

In this interlock mechanism, when the lens barrel moves between a collapsed state and an image-taking state (wide-angle state), the driving force of the lens barrel is not transmitted to the view finder cam plate 46. Then, when the lens barrel moves between the wide-angle state and the telephoto state, the view finder cam plate 46 is driven.

For this reason, it is possible to reduce the driving range of the view finder cam plate 46 compared to the case where the cam member is moved according to the movement of the lens barrel between the collapsed state and telephoto state and thereby reduce the size of the camera.

Here, the view finder cam plate 46 is energized leftward in FIG. 17 by a tensile spring 47 and when the lens barrel moves from the wide-angle state to the telephoto state, the view finder cam plate 46 is driven rightward in FIG. 17 against the spring force of the tensile spring 47 (force indicated by arrow B in FIG. 17).

In the interlock mechanism using the above described view finder cam plate 46, the lens holding members 56 and 57 are energized by a tensile spring 59a in a direction in which both lens holding members come closer to each other as shown in FIG. 17 and pushed to one side by the follower portions 56a and 57a contacting the inner wall surfaces of the cam groove portions 46c and 46d.

At this time, the force generated by the tensile spring 59a is transmitted to the cam groove portions 46c and 46d through the follower portions 56a and 57a of the lens holding members 56 and 57 and a force is generated rightward (force indicated by arrow F) in FIG. 17 in the view finder cam plate 46. Here, the force given by the follower portion 56a to the side of the cam groove 46c is indicated by arrow A3 and the force given by the follower portion 57a to the side of the cam groove portion 46d is indicated by arrow A4.

On the other hand, the view finder cam plate 46 is energized leftward in FIG. 17 by the tensile spring 47 as described above and two forces in opposite directions (forces indicated by arrow B and arrow F) act on the view finder cam plate 46.

For this reason, the force (arrow B) by the tensile spring 47 which moves the view finder cam plate 46 in one direction (leftward in FIG. 17) is canceled out by the amount of the force (arrow F) with which the tensile spring 59a moves the view finder cam plate 46 in another direction (rightward in FIG. 17).

Here, when the view finder cam plate 46 is driven from the telephoto state to the wide-angle state, the view finder cam plate 46 is driven by only the spring force of the tensile spring 47. However, the part of the one-directional moving force of the view finder cam plate 46 by the tensile spring 47 is canceled out by the another-directional moving force of the view finder cam plate 46 by the tensile spring 59a and therefore the one-directional moving force of the tensile spring 47 is weakened by the amount of the force canceled out, which may repress the view finder cam plate 46 from being driven up to the wide-angle state.

As a solution to this problem, the force of the tensile spring 47 may be strengthened, but in this case, a large driving force is required when the view finder cam plate 46 is driven against the spring force of the tensile spring 47 and, for example, a larger amount of current needs to be supplied to the driving source.

SUMMARY OF THE INVENTION

One aspect of a camera of the present invention comprises a lens unit having a movable lens of a view finder optical system, a cam member having a cam which engages with the lens unit and driving the lens unit, a first energizing member which energizes the cam member in one of moving directions of the cam member, and a second energizes member which energizes the lens unit so as to contact the cam surface. Here, throughout the entire area of the cam, the direction of a force generated by the force of the second energizing member applied to the cam member through the contact between the lens unit and the cam surface in the moving direction of the cam member substantially matches the energizing direction of the first energizing member.

The features of the camera of the present invention will become more apparent from the following detailed description of a preferred embodiment of the invention with reference to the drawings.

DETAILED DESCRIPTION OF THE PREFERRED EMBODIMENTS

With reference now to the attached drawings, a camera which is an embodiment of the present invention will be explained in detail below. The lens barrel in the camera according to this embodiment can protrude and retract in the direction of the optical axis and can move between a collapsed position at which the lens barrel is housed in the camera body and an image-taking position (from wide-angle to telephoto positions) at which the lens barrel protrudes in the direction of the optical axis. Furthermore, the optical view finder unit is driven in conjunction with the operation of the lens barrel.

Figure 1:
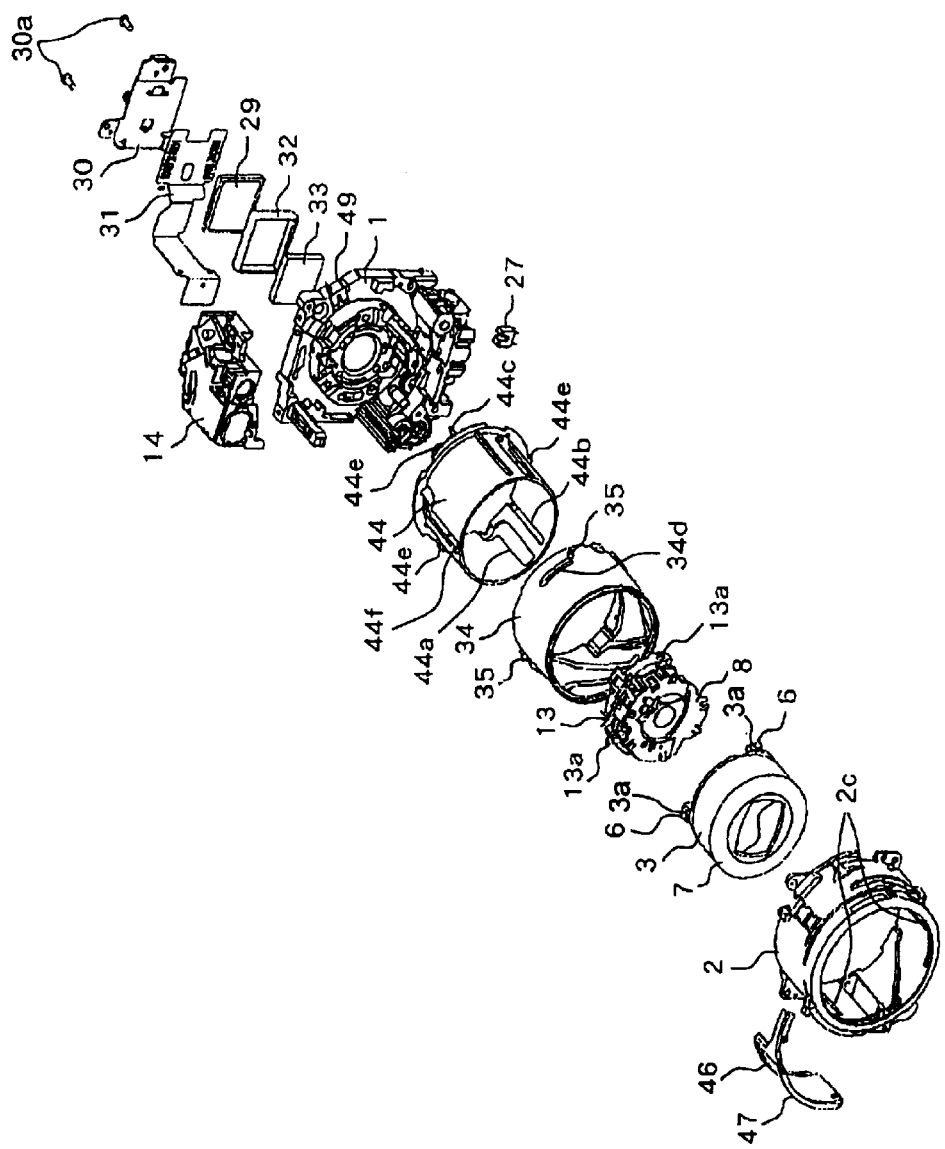
FIG. 1 is an exploded perspective view of a lens barrel of a camera which is an embodiment of the present invention.

FIG. 1 shows an exploded perspective view principally showing the lens barrel of the camera according to this embodiment. In FIG. 1, a fixed cylinder 2 is fixed to a base member 1 which constitutes the base of the lens barrel using screws.

A first lens barrel 3 holds a lens unit 4 (FIG. 2) and three follower pins 6 having a taper portion at the end are press fitted into the outer surface of the first lens barrel 3. Furthermore, a cap 7 is fixed to the front of the first lens barrel 3 with adhesion.

A second lens barrel 13 holds a lens unit 9 (FIG. 2) and follower portions 13a having a taper plane at the end are arranged on the outer surface of the second lens barrel 13 in the circumferential direction at regular intervals.

Figure 16:
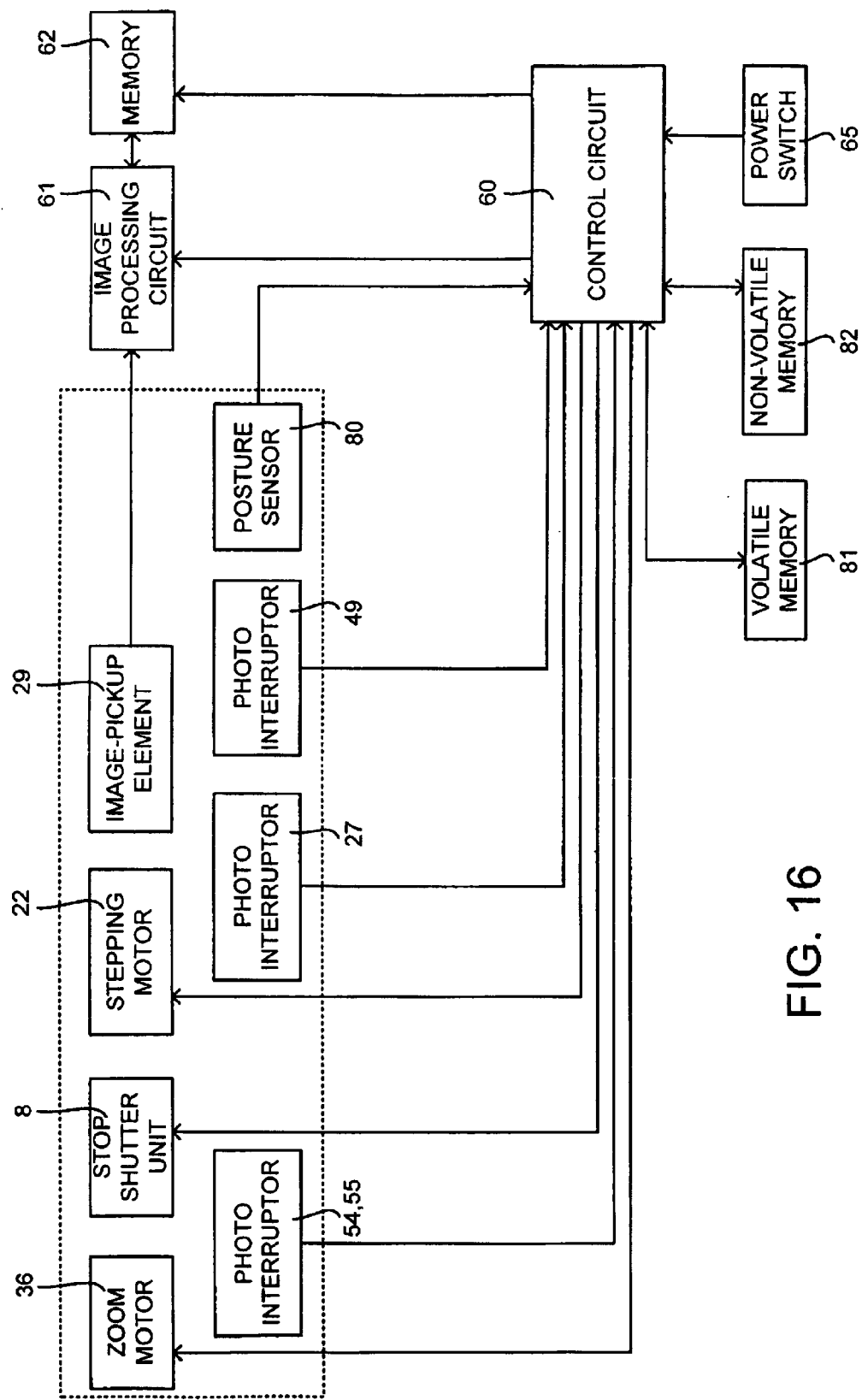
FIG. 16 is a block diagram of the camera which is the embodiment.

A stop shutter unit 8 has stop blades (not shown) and shutter blades and is fixed to the second lens barrel 13 using screws, etc. As shown in FIG. 16, the stop shutter unit 8 receives an command from a control circuit 60 in the camera and drives the stop blades and shutter blades, therefore the amount of light incident on an image plane is adjusted.

Figure 5:
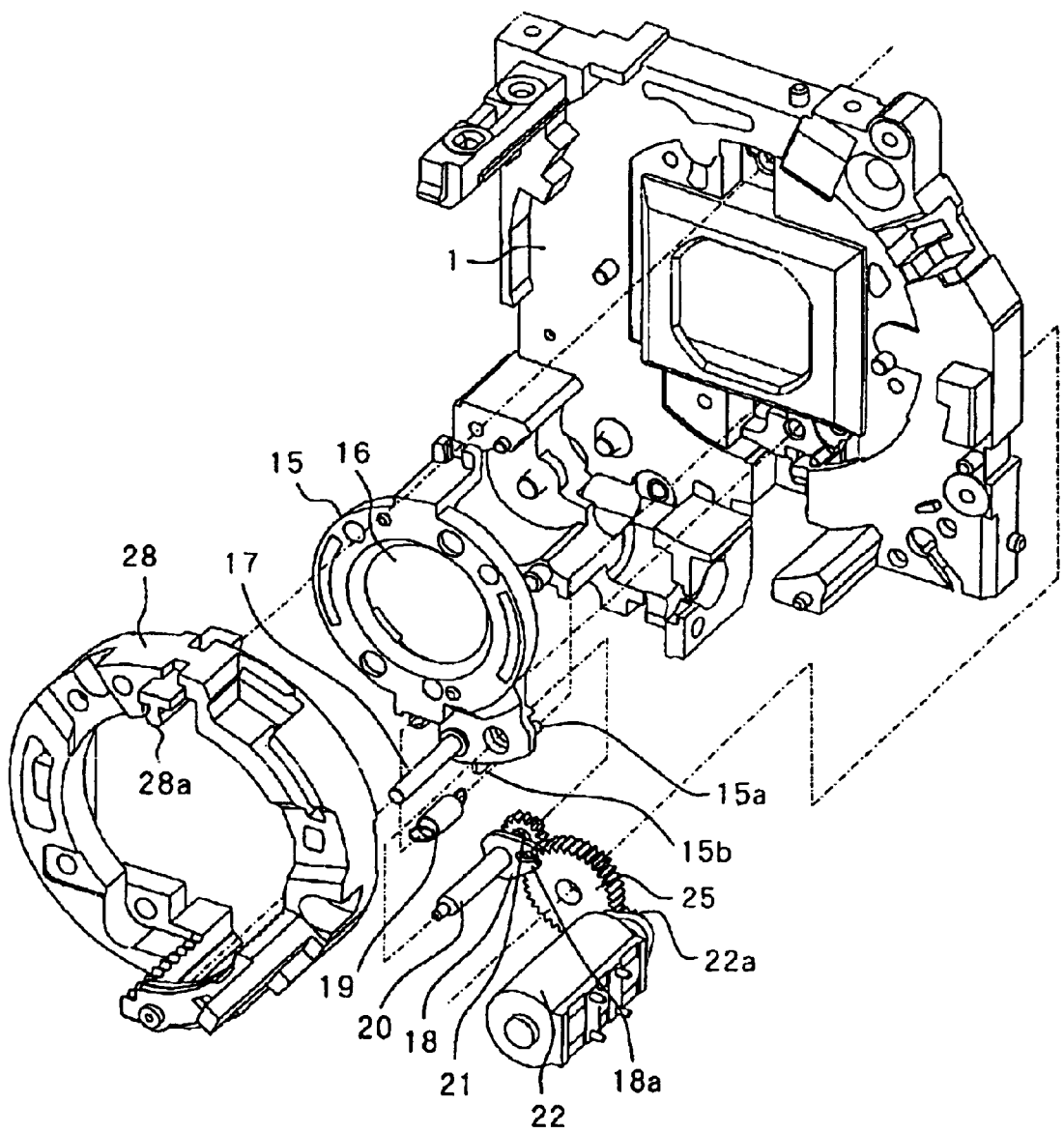
FIG. 5 is a diagram showing a partial structure of the lens barrel.

FIG. 5 illustrates a partial structure of the lens barrel.

In FIG. 5, a third lens barrel 15 which holds a lens 16 engages with a guide bar 17 which extends in the direction of the optical axis and engages with a guide shaft 28a which is provided in a cap 28 and extends in the direction of the optical axis. This makes the third lens barrel 15 to move in the direction of the optical axis.

The cap 28 is fixed to the base member 1. A lead screw 20 is connected to a stepping motor 22 through a gear 21, idler gear 25 and gear 22a and rotates by receiving a driving force from the stepping motor 22.

A nut 18 engages with the lead screw 20 and the nut 18 moves along the lead screw 20 when the lead screw 20 rotates. Here, a groove portion 18a of the nut 18 engages with a protrusion 15a of the third lens barrel 15, and therefore the nut 18 does not rotate around the axis of the lead screw 20 but only moves in the axial direction.

Furthermore, the nut 18 contacts a flange plane of the third lens barrel 15, and therefore when the nut 18 moves along the lead screw 20, the third lens barrel 15 moves in the direction of the optical axis. Here, the third lens barrel 15 is energized (moved to one side) by a tensile spring 19 in the direction in which it contacts the nut 18.

In FIG. 1, an image-pickup element 29 such as a CCD, etc., is fixed with adhesion, etc., to a holding plate 30 which is fixed to the base member 1 using screws 30a. This embodiment will describe a digital camera using the image-pickup element 29 but the present invention is also applicable to a camera using a film.

A flexible circuit board 31 is soldered to the image-pickup element 29 and supplies a signal photoelectrically converted by the image-pickup element 29 to an image processing circuit 61 (FIG. 16). As shown in FIG. 16, the image processing circuit 61 receives a control signal from the control circuit 60 in the camera, performs predetermined processing on the signal input from the image-pickup element 29 and outputs the image signal to a memory 62.

The image data generated by the image processing circuit 61 is output to a display unit (not shown), displayed as an image taken on the display unit or recorded in a recording medium (not shown). Furthermore, an attitude sensor 80 detects an attitude of the camera (lateral position and longitudinal position) which is held by a photographer and outputs the detection result to the control circuit 60. The control circuit 60 changes the orientation of the image displayed on the above described display unit based on the detection result of the attitude sensor 80. A volatile memory 81 and a non-volatile memory 82 store programs, etc., for operating the control circuit 60.

A dust-proof rubber 32 and an LPF (low pass filter) 33 shown in FIG. 1 are fixed to the base member 1 using an adhesive, etc.

Figure 12:
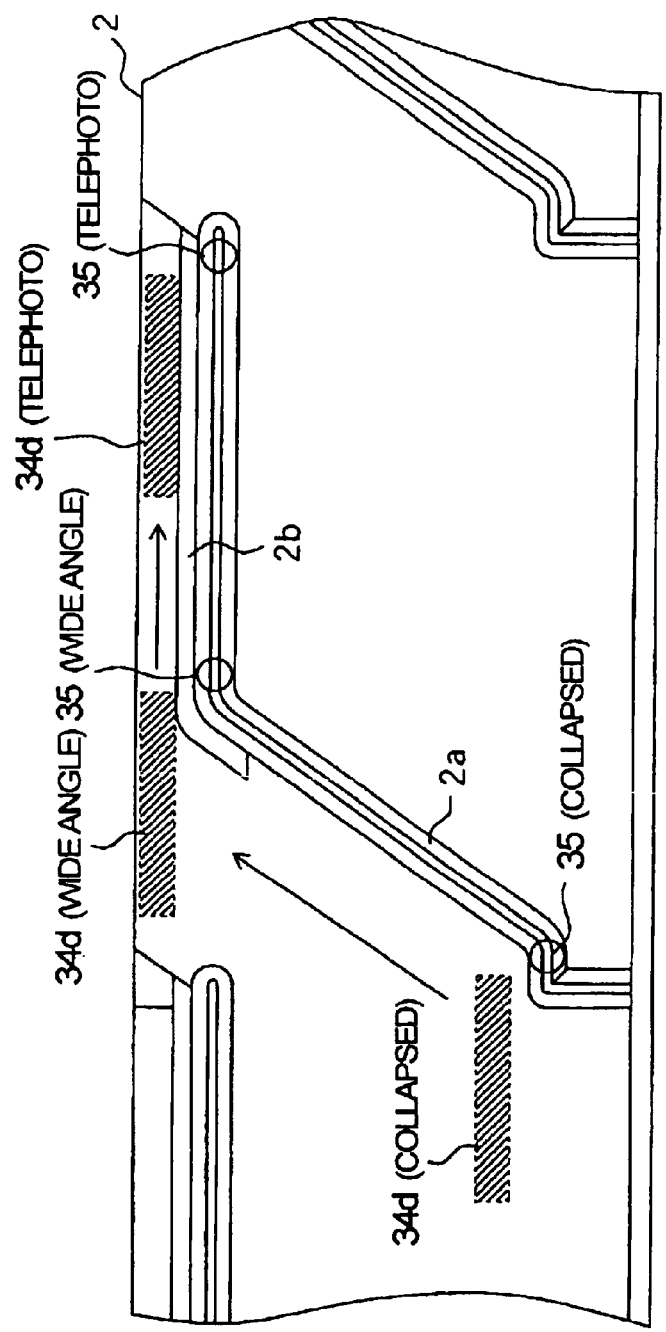
FIG. 12 is an exploded view of the fixed cylinder.

Metallic follower pins 35 are press fitted into the outer surface of the movable cam ring 34 and these follower pins 35 engage with cam groove portions 2a formed on the inner surface of the fixed cylinder 2 as shown in FIG. 12. When the movable cam ring 34 rotates around the optical axis as will be described later, the follower pins 35 move along the cam groove portions 2a and the movable cam ring 34 moves in the direction of the optical axis with respect to the fixed cylinder 2.

Furthermore, a protrusion 34d is formed on the outer surface of the movable cam ring 34 and extends in the circumferential direction of the movable cam ring 34. The protrusion 34d moves according to the movement of the movable cam ring 34 as shown in FIG. 12. Then, when the movable cam ring 34 is in a telephoto state, the protrusion 34d contacts a flange 2b formed on the inner surface of the fixed cylinder 2.

Figure 6:
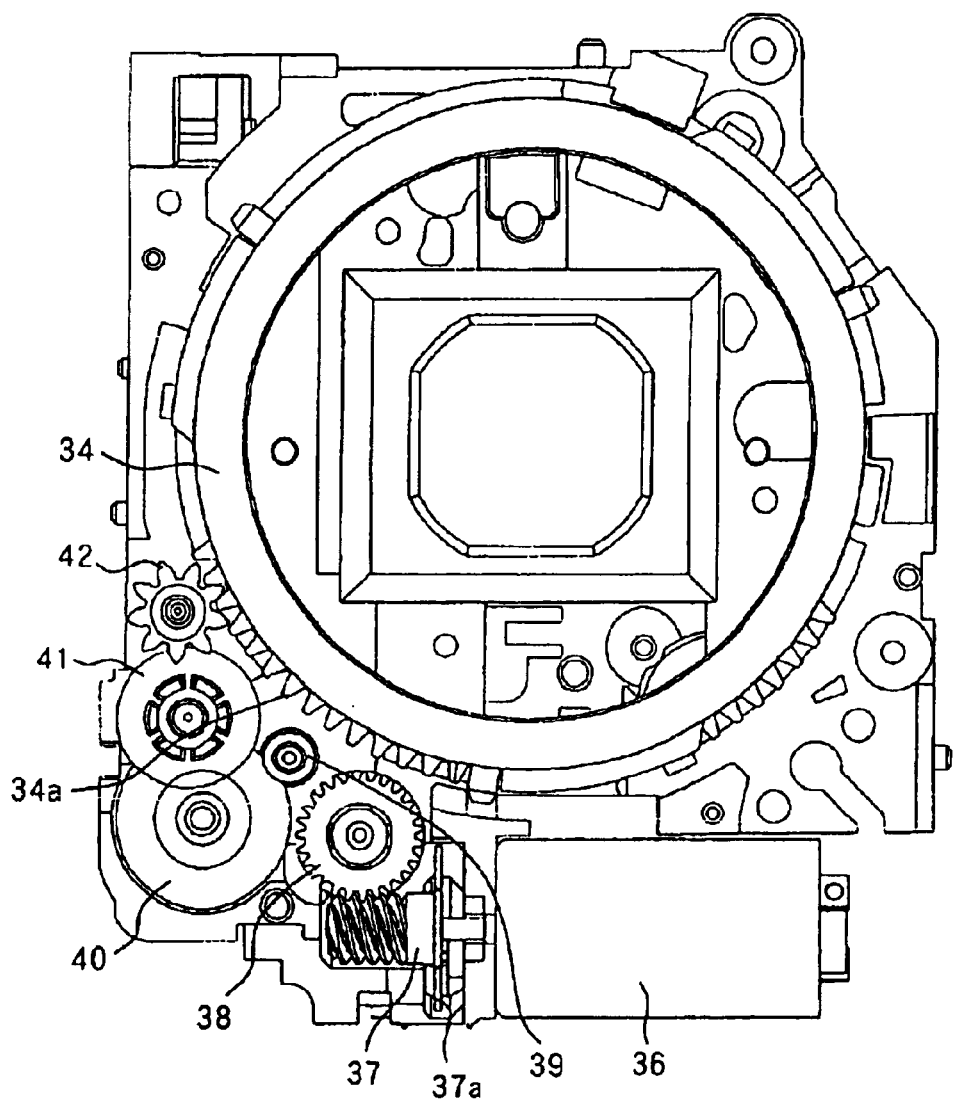
FIG. 6 illustrates a driving mechanism of a movable cam ring.

Furthermore, as shown in FIG. 6, gear teeth 34a are formed on the outer surface of the movable cam ring 34 and extend in the circumferential direction of the movable cam ring 34. The gear teeth 34a are connected to a zoom motor 36 through a reduction gear train 37 to 42. This causes the driving force of the zoom motor 36 to be transmitted to the movable cam ring 34 through the reduction gear train 37 to 42 and the movable cam ring 34 rotates around the optical axis.

Here, the gear 37 press fitted into the rotating shaft of the zoom motor 36 is provided with three blades 37a for detecting the rotation of the zoom motor 36 and these blades 37a can move forward or backward in slits of photo interrupters 54 and 55 (FIG. 16) according to the rotation of the zoom motor 36.

This causes the photo interrupters 54 and 55 to output signals according to the rotation of the zoom motor 36 and these output signals are input to the control circuit 60 as shown in FIG. 16. The control circuit 60 carries out a predetermined calculation based on the input signals from the photo interrupters 54 and 55 and thereby detects the number of revolutions and rotation direction of the zoom motor 36.

In FIG. 1, a view finder cam plate (cam member) 46 is placed along the outer surface of the fixed cylinder 2. One end of a tensile spring (first energizing member) 47 is fixed to the view finder cam plate 46 and the other end is fixed to the fixed cylinder 2, the tensile spring thereby energizes the view finder cam plate 46 around the optical axis in one direction.

Figure 8:
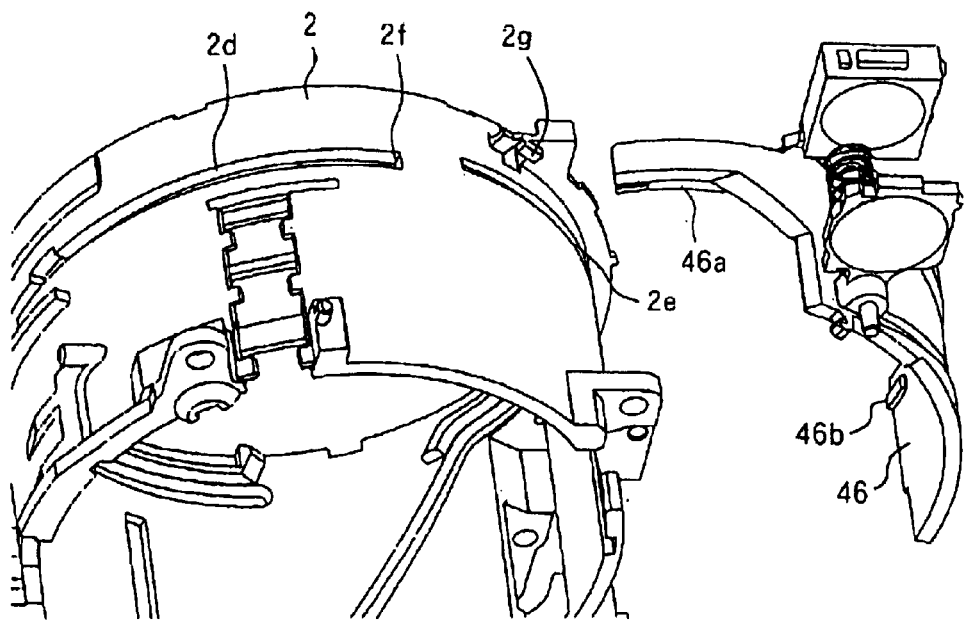
FIG. 8 is an external perspective view of a view finder cam plate and a fixed cylinder.

As shown in FIG. 8, key portions 46a and 46b are formed on the rear face (inner face) of the view finder cam plate 46. The key portions 46a and 46b engage with groove portions 2d and 2e formed on the outer surface of the fixed cylinder 2 and move along the groove portions 2d and 2e. This causes the view finder cam plate 46 to move along the outer surface of the fixed cylinder 2. Here, the key portion 46a penetrates the groove portion 2d and protrudes from the inner surface of the fixed cylinder 2.

Furthermore, a rib 2g is formed on the outer surface of the fixed cylinder 2 and the rib 2g contacts the surface of the view finder cam plate 46 to thereby repress the view finder cam plate 46 from coming off the fixed cylinder 2.

Figure 10:
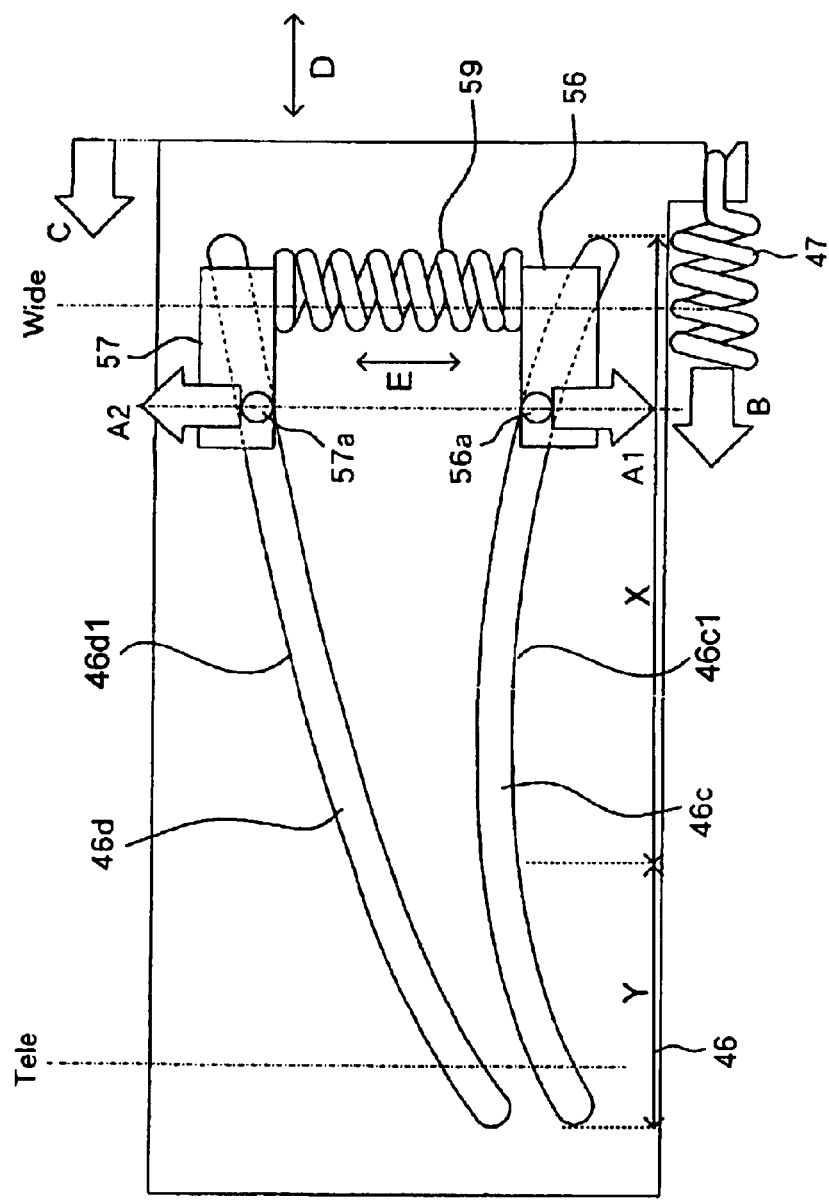
FIG. 10 illustrates a principle of operation of the view finder cam plate according to the embodiment.

On the other hand, as shown in FIG. 10, taper cam groove portions 46c and 46d are formed on the surface of the view finder cam plate 46 and the taper cam groove portions 46c and 46d engage with a follower portion 56a of a lens holding member 56 which holds a compensator lens (movable lens) and a follower portion 57a of a lens holding member 57 which holds a variator lens (movable lens) as will be described later.

When the view finder cam plate 46 moves along the outer surface of the fixed cylinder 2 (direction indicated by arrow D in FIG. 10), the follower portions 56a and 57a are guided by the taper cam groove portions 46c and 46d and move in the direction of the optical axis (direction indicated by arrow E in FIG. 10).

In FIG. 1, the rectilinear guide cylinder 44 is placed inside the movable cam ring 34, protrusions 44e formed on the outer surface of the rear end part of the rectilinear guide cylinder 44 engage with groove portions 2c which are formed on the inner surface of the fixed cylinder 2 and extend in the direction of the optical axis. Thus, the rectilinear guide cylinder 44 can move only in the direction of the optical axis with respect to the fixed cylinder 2.

Figure 11:
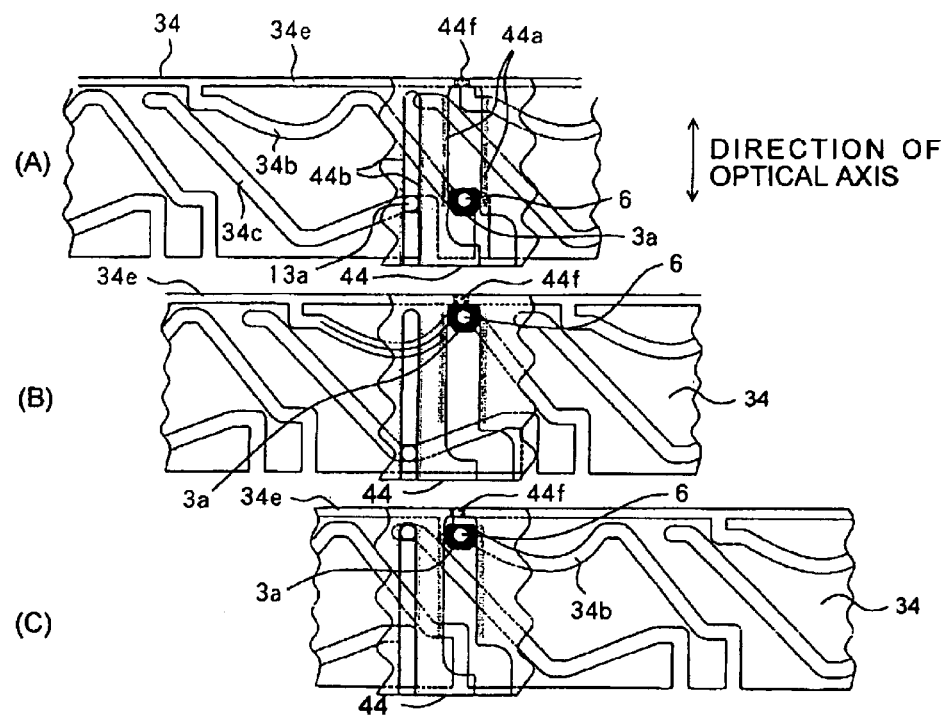
FIGS. 11(A) to (C) are exploded views of the movable cam ring and a rectilinear guide cylinder.

Furthermore, three protrusions 44f are formed at the end of the rectilinear guide cylinder 44 and these protrusions 44f engage with groove portions 34e which are provided on the inner surface of the movable cam ring 34 and extend in the circumferential direction as shown in FIG. 11. This allows the movable cam ring 34 to rotate around the optical axis with respect to the rectilinear guide cylinder 44 and move together with the rectilinear guide cylinder 44 in the direction of the optical axis. FIG. 11(A) to (C) show the movable cam ring 34 and rectilinear guide cylinder 44 superimposed in the partial area.

As shown in FIG. 11, cam groove portions 34b and 34c are formed on the inner surface of the movable cam ring 34, a follower pin 6 of the first lens barrel 3 engages with the cam groove portion 34b and the end of the follower portion 13a of the second lens barrel 13 engages with the cam groove portion 34c.

When the movable cam ring 34 rotates around the optical axis (moves in the horizontal direction of FIG. 11), the follower pin 6 moves along the cam track of the cam groove portion 34b and the follower portion 13a moves along the cam track of the cam groove portion 34c.

Here, the rectilinear guide cylinder 44 is provided with rectilinear groove portions 44a and 44b as shown in FIG. 11. The rectilinear groove portion 44a engages with the rectilinear pin 3a provided on the first lens barrel 3 to repress the first lens barrel 3 from displacing around the optical axis. The rectilinear pin 3a is formed at the base end of the follower pin 6 as one piece.

On the other hand, the follower portion 13a of the second lens barrel 13 engages with the rectilinear groove portion 44b on its base end side to repress the second lens barrel 13 from displacing around the optical axis.

In the above described structure, the first lens barrel 3 moves only in the direction of the optical axis through the engagement between the cam groove portion 34b and follower pin 6 and through the engagement between the rectilinear groove portion 44a and rectilinear pin 3a (FIG. 11(A) to (C)). Furthermore, the second lens barrel 13 moves only in the direction of the optical axis through the engagement with the follower portion 13a, cam groove portion 34c and rectilinear groove portion 44b (FIG. 11(A) to (C)).

Figure 7:
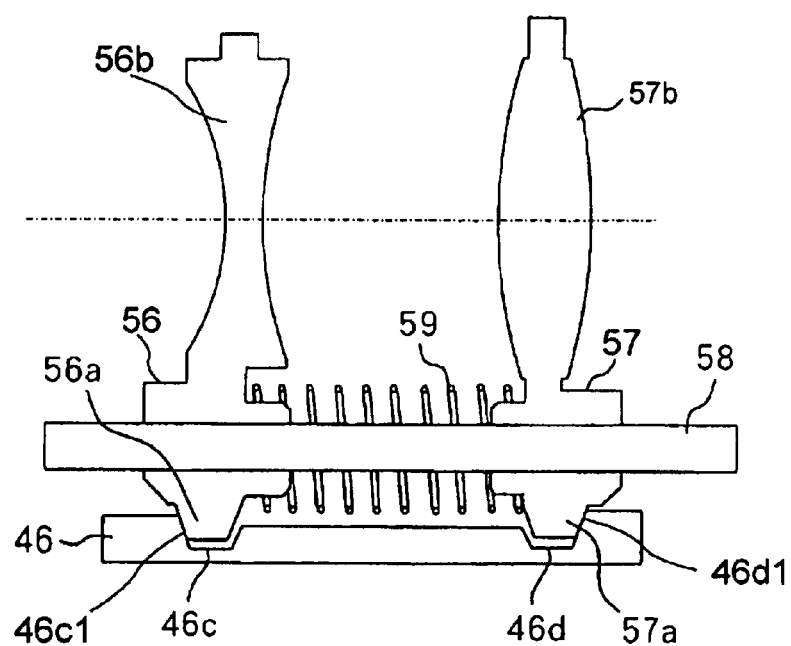
FIG. 7 is a cross-sectional view showing a partial structure of an optical view finder unit.

Then, using FIG. 7 and FIG. 9 the structure of the optical view finder unit 14 (FIG. 1) will be explained.

An objective lens 68, a compensator lens 56b, a variator lens 57b and a prism 69 are housed in a first view finder base 50. The objective lens 68 is fixed to the first view finder base 50 with adhesion, etc.

Lens holding members 56 and 57 holding the compensator lens 56b and variator lens 57b engage with a guide bar 58 which extends in the direction of the optical axis and can move along the guide bar 58. The guide bar 58 is fixed to the first view finder base 50 at both ends thereof.

A follower portion 56a is formed on the lens holding member 56 and the follower portion 56a engages with the taper cam groove portion 46c of the view finder cam plate 46 (FIG. 10). Furthermore, a follower portion 57a is formed on the lens holding member 57 and the follower portion 57a engages with the taper cam groove portion 46d of the view finder cam plate 46 (FIG. 10).

The lens holding members 56 and 57 are provided with spring members 66 and 67 for moving these lens holding members 56 and 57 to one side of the first view finder base 50 and eliminating backlash around the axis of the guide bar 58.

A compression spring (second energizing member) 59 is placed between the lens holding members 56 and 57 and the compression spring 59 moves the lens holding members 56 to one side and moves the lens holding member 57 to another side by energizing the lens holding members 56 and 57 so as to separate from each other in the direction of the optical axis.

As shown in FIG. 10, this causes a force indicated by arrow A1 to apply to the outer wall surface (lower wall surface 46c1 in FIG. 10) of the taper cam-groove portion 46c through the follower portion 56a and a force indicated by arrow A2 to apply to the outer wall surface (upper wall surface 46d1 in FIG. 10) of the taper cam groove portion 46d through the follower portion 57a.

Here, the view finder cam plate 46 can only move in the direction indicated by arrow D in FIG. 10, and therefore by receiving the forces indicated by arrows A1 and A2 from the follower portions 56a and 57a, the force indicated by arrow C is generated in the view finder cam plate 46. The force indicated by the arrow C becomes a force component which acts in the direction of driving the view finder cam plate 46 by the spring force of the compression spring 59.

The force indicated by arrow C varies depending on the tilt angle, etc., of the taper cam groove portions 46c and 46d and increases when the follower portions 56a and 57a are in an area near the wide-angle positions of the taper cam groove portions 46c and 46d.

Here, since the taper cam groove portion 46d is inclined from the left end to the right end in FIG. 10 throughout the range of the taper cam groove portion 46d, by receiving the force indicated by arrow A2 from the follower portion 57a, a force component in the direction indicated by arrow C always applies to the view finder cam plate 46.

On the other hand, the tilt angle of the taper cam groove portion 46c is inverted on the border between a first area X and a second area Y. Here, in the first area X, by receiving the force indicated by arrow A1 from the follower portion 56a, a force component in the direction indicated by arrow C applies to the view finder cam plate 46. The tilting of the cam in the second area Y is inverted with respect to the tilting of the cam in the first area X, and therefore by receiving the force indicated by arrow A1 from the follower portion 56a, a force component in the direction opposite to the direction indicated by arrow C applies to the view finder cam plate 46. However, since the force component in the direction opposite to the direction indicated by arrow C is mostly canceled out by the force component received from the follower portion 57a, it does not affect the spring force of the tensile spring 47.

Figure 9:
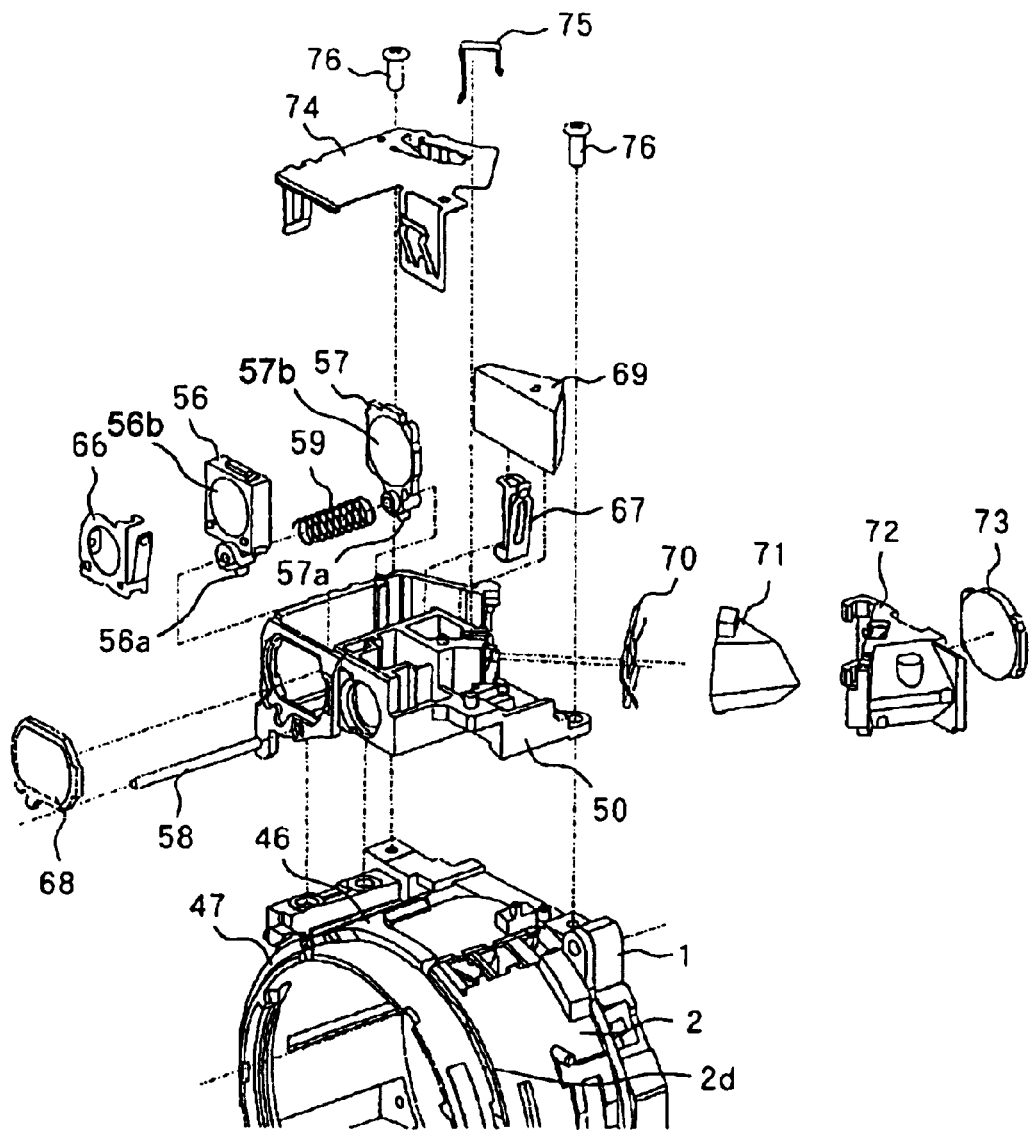
FIG. 9 is an exploded perspective view of the optical view finder unit.

In FIG. 9, a field of view mask 70 regulates the field of view range of the view finder. A second view finder base 72 holds an eye piece system lens made up of a roof prism 71 and eye piece lens 73. The second view finder base 72 and first view finder base 50 are connected by a clip 75.

A top plate 74 is placed in such a way as to cover the top of the first view finder base 50.

In the above described structure of the optical view finder unit 14, an object light flux incident from the objective lens 68 passes through the compensator lens 56b and variator lens 57b, is refracted by the prism 69 and roof prism 71 and guided into the eye piece lens 73. This allows the photographer to observe the object image through the eye piece lens 73.

In this embodiment, the view finder cam plate 46 moves in conjunction with the operation of the lens barrel and the compensator lens 56b and variator lens 57b move in the direction of the optical axis, and therefore the photographer can observe the object image through the eye piece lens 73 at substantially the same angle of view as the image-taking angle of view.

The above described optical view finder unit 14 is fixed to the base member 1 using a screw 76.

Then, the lens barrel protruding/retracting operation and the operation of the optical view finder unit 14 according to the operation of the lens barrel of the camera in the above described structure will be explained.

In FIG. 16, when power is turned on by operating a power switch 65, the control circuit 60 sends a driving signal to the zoom motor 36 to thereby drive the zoom motor 36. This causes the lens barrel to protrude from a collapsed position to an image-taking waiting position (wide-angle waiting position).

At this time, when the driving force of the zoom motor 36 is transmitted to the gear teeth 34a of the movable cam ring 34 through the reduction gear train 37 to 42 (FIG. 6), the movable cam ring 34 rotates around the optical axis in one direction (clockwise in FIG. 6) and protrudes in the direction of the optical axis through the engagement operation of the follower pin 35 and cam groove portion 2a.

Furthermore, when the movable cam ring 34 rotates around the optical axis, the first lens barrel 3 protrudes in the direction of the optical axis through the engagement operation between the follower pin 6 and cam groove portion 34b and the second lens barrel 13 protrudes in the direction of the optical axis through the engagement operation between the follower portion 13a and cam groove portion 34c.

Figure 13:
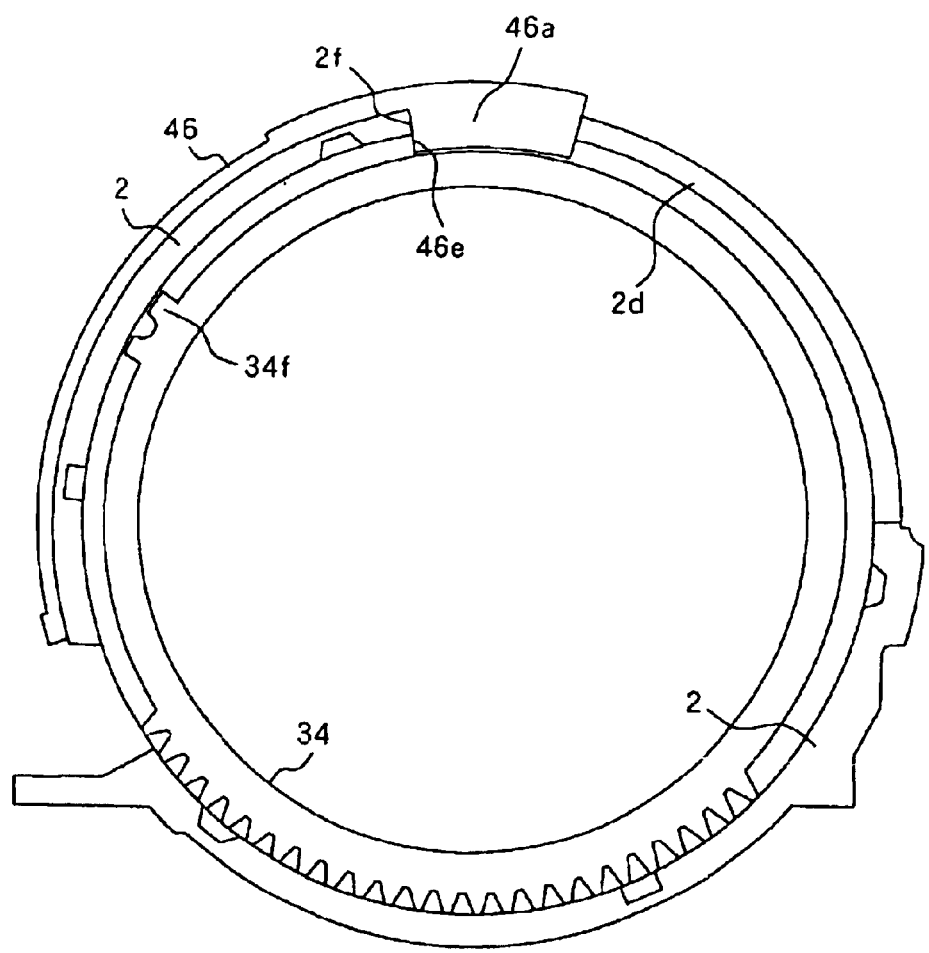
FIG. 13 is a front view of the lens barrel.

While the lens barrel protrudes from a collapsed position to just before the wide-angle waiting position, the view finder cam plate 46 receives the spring force of the tensile spring 47 and as shown in FIG. 13, stands still at a position where the end face 46e of the key portion 46a contacts the end face 2f of the groove portion 2d of the fixed cylinder 2. Here, the key portion 46a protrudes inward from the inner surface of the fixed cylinder 2.

When the lens barrel protrudes up to the wide-angle waiting position, a protrusion 34f formed on the outer surface of the movable cam ring 34 contacts the key portion 46a of the view finder cam plate 46 according to the rotation of the movable cam ring 34.

Figure 3:
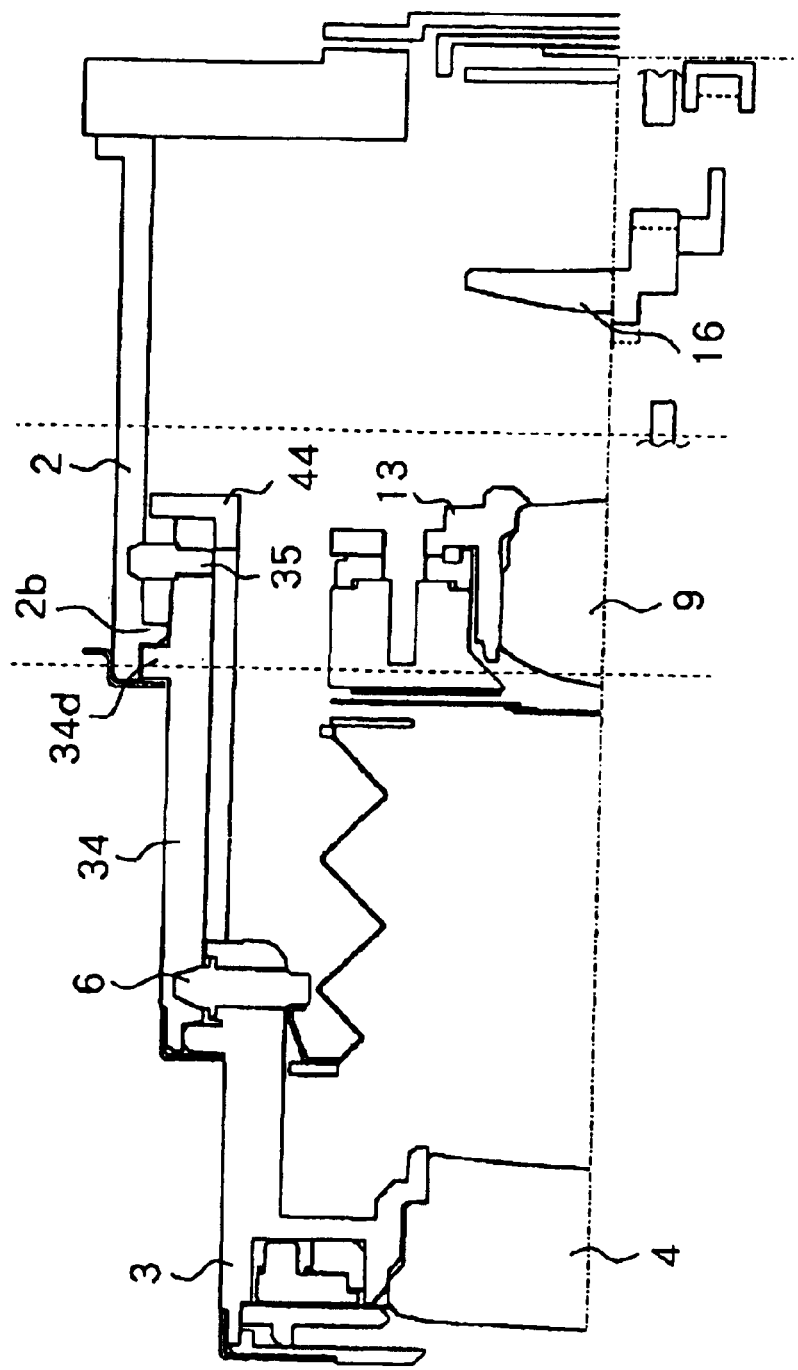
FIG. 3 is a cross-sectional view in the direction of the optical axis of the lens barrel in a wide-angle waiting state.
Figure 14:
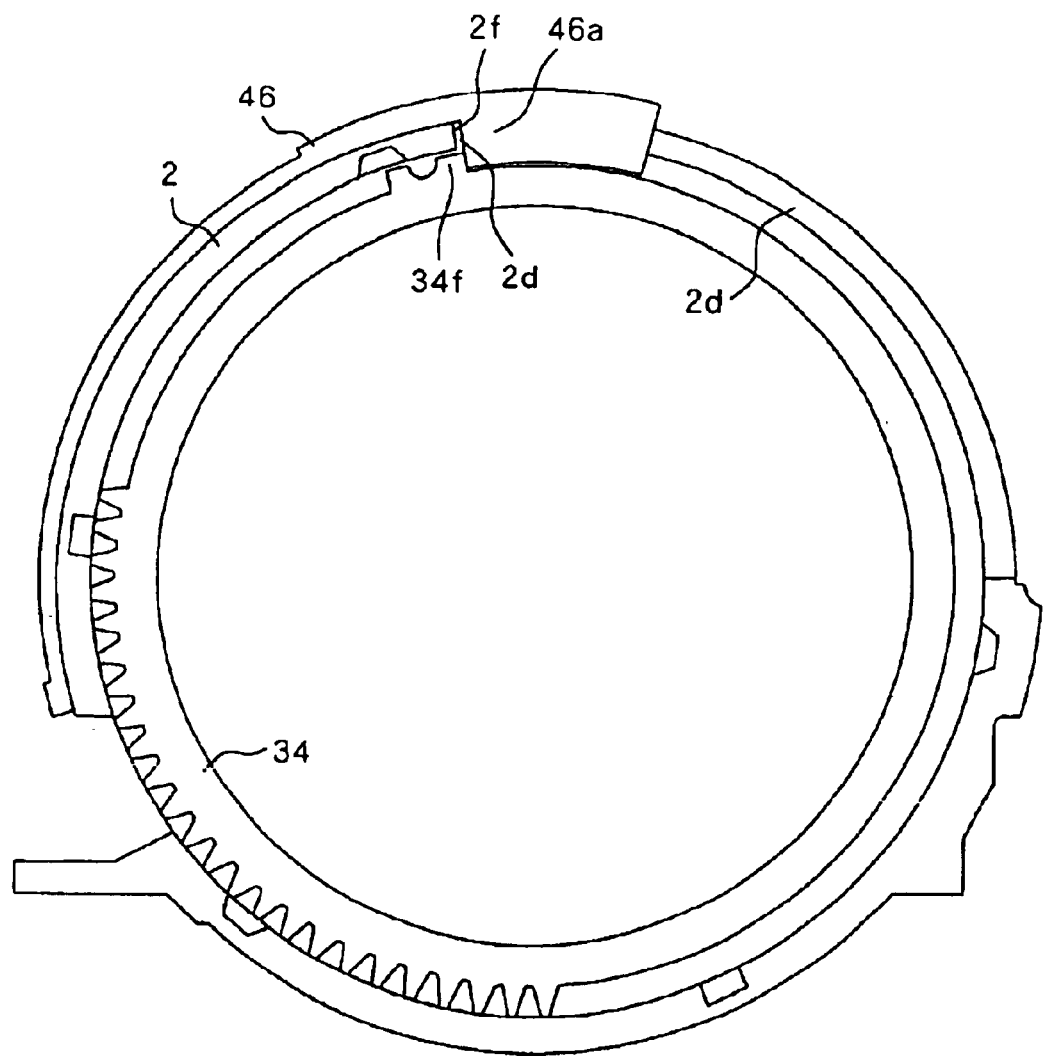
FIG. 14 is a front view of the lens barrel.

Then, when the movable cam ring 34 rotates a predetermined amount clockwise in FIG. 14 with the protrusion 34f contacting the key portion 46a, the lens barrel protrudes up to the wide-angle waiting position. At this time, the protrusion 34f rotates the view finder cam plate 46 against the spring force of the tensile spring 47. A cross-sectional view in the direction of the optical axis of the lens barrel in the wide-angle waiting state is shown in FIG. 3.

As shown in FIG. 10, a compression spring 59 energizes the lens holding member 56 (compensator lens 56b) and lens holding member 57 (variator lens 57b) so as to further away from each other in the direction of the optical axis (directions indicated by arrows A1 and A2). That is, the compression spring 59 energizes the lens holding members 56 and 57 so that the distance between the lens holding member 56 and the lens holding member 57 in the optical axis direction is increased.

Here, the taper cam groove portions 46c and 46d are formed with an angle with respect to the longitudinal direction of the view finder cam plate 46 (in the horizontal direction in FIG. 10) and the view finder cam plate 46 receives a spring force from the compression spring 59 through the follower portions 56a and 57a and thereby a force indicated by arrow C operates to the view finder cam plate 46.

The direction of the force indicated by arrow C matches the one-directional moving direction of the view finder cam plate 46 by the tensile spring 47 that is, matches the direction of the force (spring force of the tensile spring 47) indicated by arrow B. The view finder cam plate 46 is energized around the optical axis in one direction by a resultant of the force indicated by arrow C and the force indicated by arrow B.

This causes the key portion 46a of the view finder cam plate 46 to constantly contact the protrusion 34f of the movable cam ring 34.

In FIG. 16, when the control circuit 60 detects based on the output from the photo interrupters 54 and 55 that the movable cam ring 34 has moved up to the wide-angle position, the control circuit 60 drives the stepping motor 22 and thereby causes the third lens barrel 15 which is at a retracted position to move to the initial position.

When the stepping motor 22 is driven by receiving a command from the control circuit 60, the driving force of the stepping motor 22 is transmitted to the lead screw 20 through gears 22a, 25 and 21, and the lead screw 20 rotates (FIG. 5). This causes the nut 18 to move along the lead screw 20 in the direction of the optical axis, and the third lens barrel 15 also moves in the direction of the optical axis following the nut 18.

At this time, a slit plate 15b formed on the third lens barrel 15 moves forward or backward into/from the slit portion of a photo interrupter 27 and thereby the output of the photo interrupter 27 is changed. In response to the switching of the output of the photo interrupter 27, the control circuit 60 resets a counter and stops the driving of the third lens barrel 15. Then, the operation for moving the third lens barrel 15 to the initial position is completed.

After the operation for moving the third lens barrel 15 to the initial position is completed, the control circuit 60 drives the stepping motor 22 to move the third lens barrel 15 to a predetermined position (in-focus position) (focusing operation). Then, the control circuit 60 controls the stop and white balance, etc., based on the brightness, etc., of the object and thereby completes the image-taking preparation operation.

On the other hand, when the photographer operates a zoom lever (not shown) provided in the camera to the telephoto side, the zoom motor 36 starts to rotate in one direction and the lens barrel protrudes in the direction of the optical axis. At this time, signals from the photo interrupters 54 and 55 are input to the control circuit 60 according to the rotation of the zoom motor 36.

In response to the input signal from the photo interrupters 54 and 55, the control circuit 60 starts counting and monitors the count value. Then, the control circuit 60 drives and controls the zoom motor 36 based on the count value and moves the first lens barrel 3 and second lens barrel 13 to predetermined zoom positions.

Figure 4:
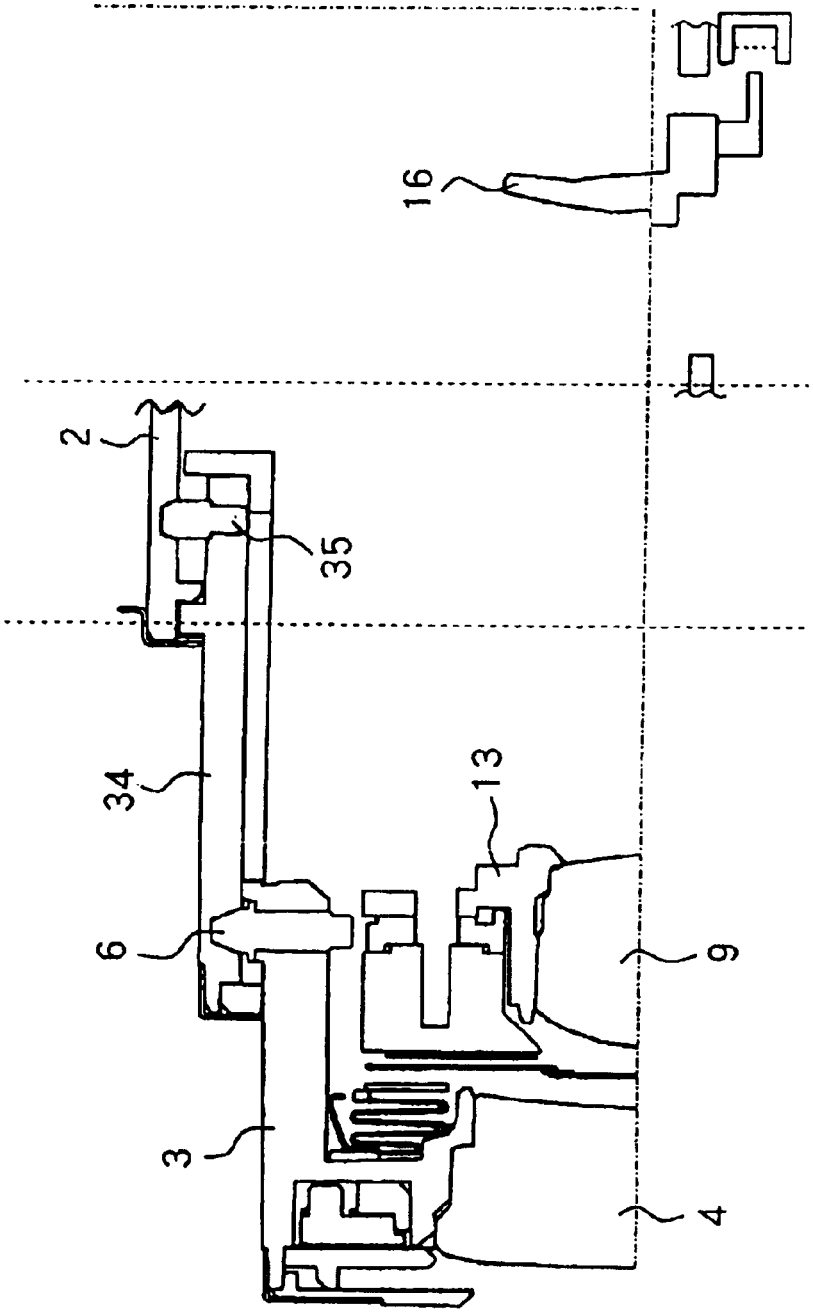
FIG. 4 is a cross-sectional view in the direction of the optical axis of the lens barrel in a telephoto state.

Here, a cross-sectional view in the direction of the optical axis of the lens barrel in a telephoto state is shown in FIG. 4.

At this time, the movable cam ring 34 has moved the view finder cam plate 46 against the spring force (one-directional moving force) by the tensile spring 47 and compression spring 59 and when the view finder cam plate 46 moves, the variator lens 56b and compensator lens 57b move in the direction of the optical axis. This allows a magnification-varying operation of the view finder optical system according to the magnification-varying operation of the image-taking optical system.

While the photographer operates the zoom lever, magnification-varying operations of the image-taking optical system and view finder optical system are performed and when the photographer stops the operation of the zoom lever, the image-taking optical system and view finder optical system stop at predetermined zoom positions.

Figure 15:
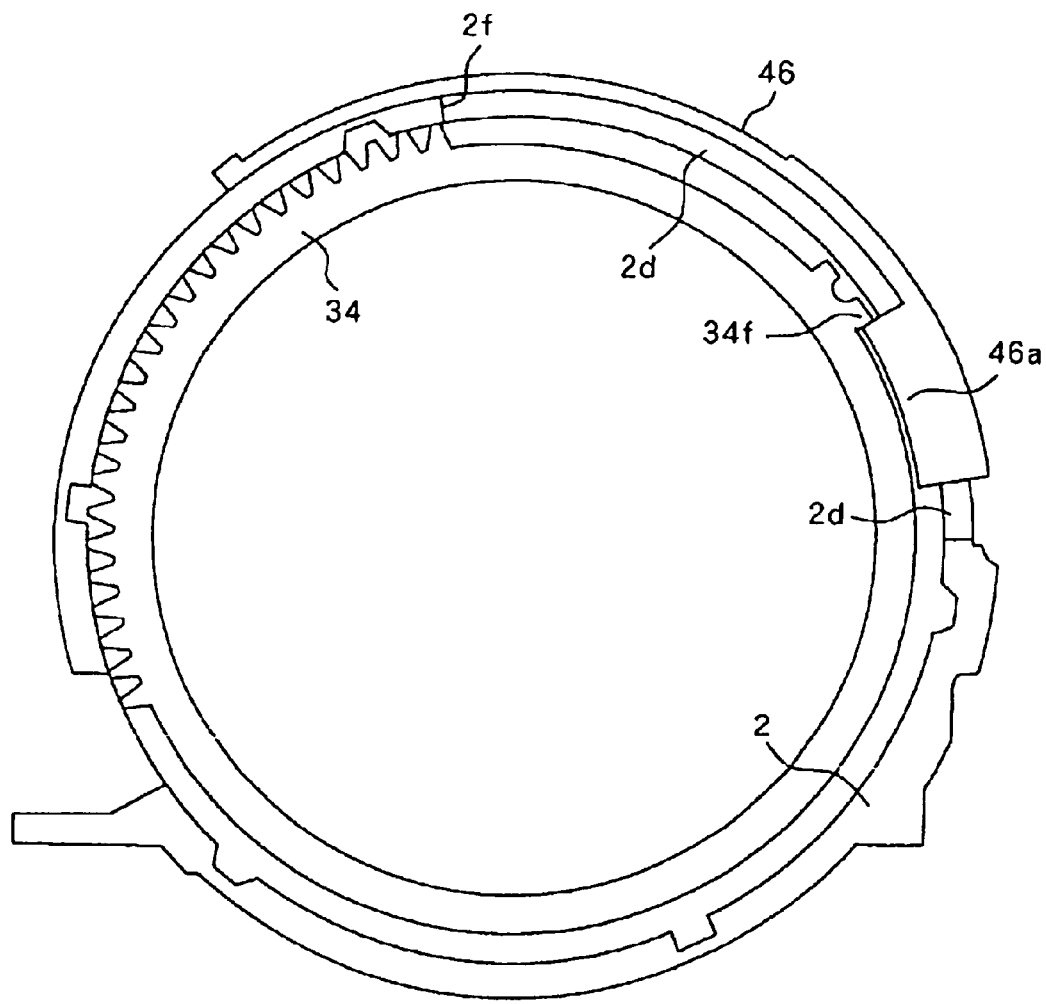
FIG. 15 is a front view of the lens barrel.

When the photographer operates the zoom lever to the wide-angle side, the zoom motor 36 starts to rotate in another direction and the movable cam ring 34 rotates counterclockwise in FIG. 15 according to the rotation of the zoom motor 36.

At this time, the view finder cam plate 46 is energized counterclockwise in FIG. 15 by the tensile spring 47, and therefore the key portion 46a of the view finder cam plate 46 rotates together with the movable cam ring 34 while contacting the protrusion 34f of the movable cam ring 34.

As described above, the compression spring 59 energizes the variator lens 56b and compensator lens 57b in the direction in which the follower portions 56a and 57a contact the outer wall surfaces 46c1 and 46d1 of the taper cam groove portions 46c and 46d as shown in FIG. 10 and gives the leftward force (force indicated by arrow C) in FIG. 10 to the view finder cam plate 46.

Therefore, the view finder cam plate 46 also receives the same one-directional moving force as that of the tensile spring 47 by the compression spring 59.

Figure 17:
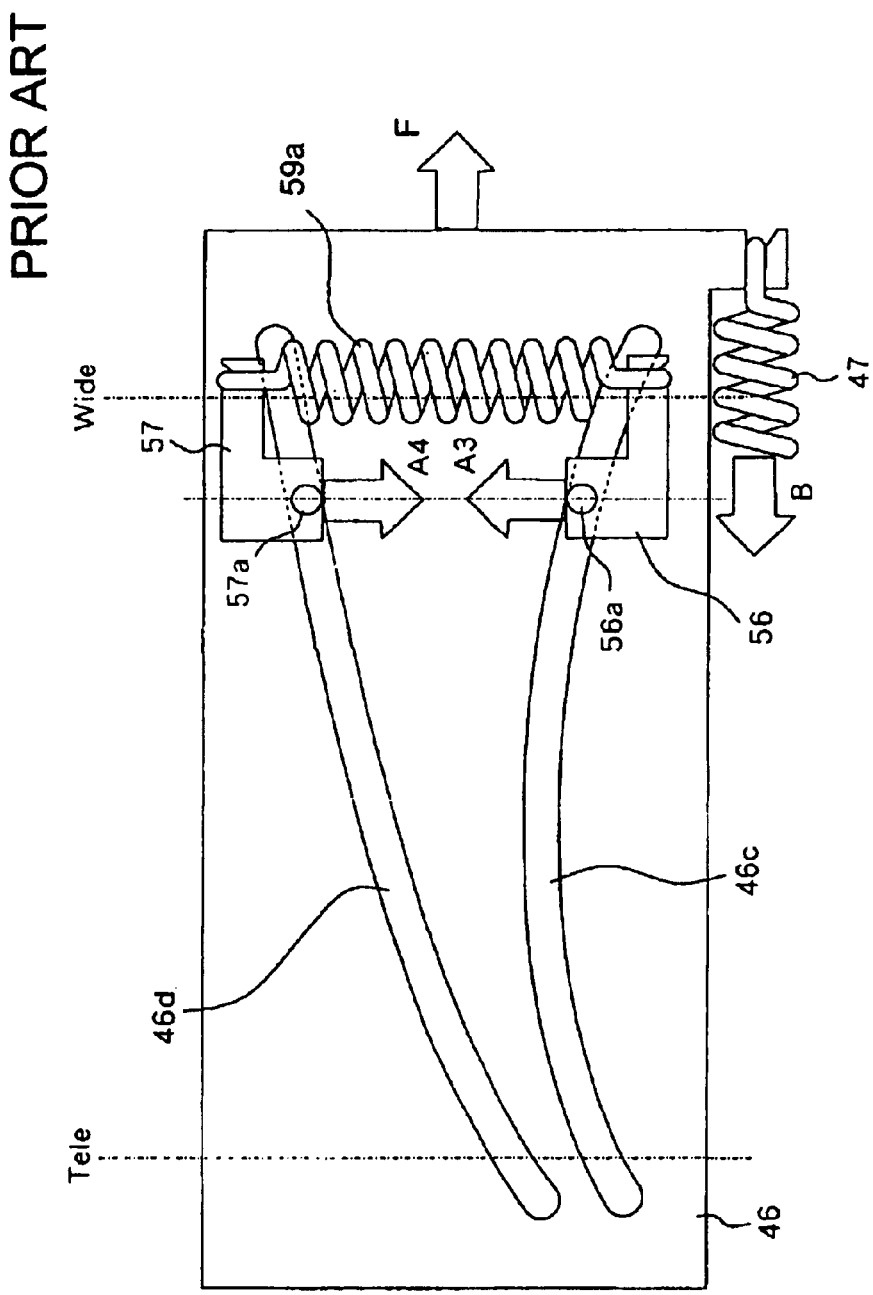
FIG. 17 illustrates a principle of operation of a view finder cam plate according to a conventional art.

This represses the force (force indicated by arrow F in FIG. 17) in the direction opposite to the energizing direction of the tensile spring 47 from acting on the view finder cam plate 46 as in the case of the conventional art and represses the spring force of the tensile spring 47 acting on the view finder cam plate 46 from weakening. When the view finder cam plate 46 is moved up to the wide-angle position by the spring force of the tensile spring 47, it is possible to repress the view finder cam plate 46 from stopping midway.

That is, it is possible to move the lens holding members 56 and 57 (follower portions 56a and 57a) up to the wide-angle positions of the taper cam groove portions 46c and 46d accurately.

Furthermore, since the camera of this embodiment does not require the spring force of the tensile spring 47 to be strengthened, it is not necessary to increase the driving force when the view finder cam plate 46 is driven against the spring force of the tensile spring 47 and it is possible to repress the amount of current supplied to the zoom motor 36 from increasing (power saving).

In FIG. 16, when the power supply of the camera is turned OFF by operating the power switch 65, the control circuit 60 receives an output signal from the power switch 65 and causes the lens barrel to retract from an image-taking position to a collapsed position.

The control circuit 60 drives the stepping motor 22 first to move the third lens barrel 15 up to the collapse waiting position. Then, the control circuit 60 drives the zoom motor 36 and causes the movable cam ring 34 to rotate around the optical axis, therefore the lens barrel retracts.

Here, until the movable cam ring 34 moves to the wide-angle waiting position, the protrusion 34f of the movable cam ring 34 contacts the key portion 46a of the view finder cam plate 46. Then, when the movable cam ring 34 moves to the wide-angle waiting position, the key portion 46a contacts the end face 2f of the groove portion 2d of the fixed cylinder 2.

From the wide-angle waiting position to the collapsed position, only the movable cam ring 34 rotates around the optical axis and the protrusion 34f moves away from the key portion 46a. Here, the view finder cam plate 46 receives the spring force of the tensile spring 47, and therefore the key portion 46a is kept at a position where it contacts the end face 2f.

Figure 2:
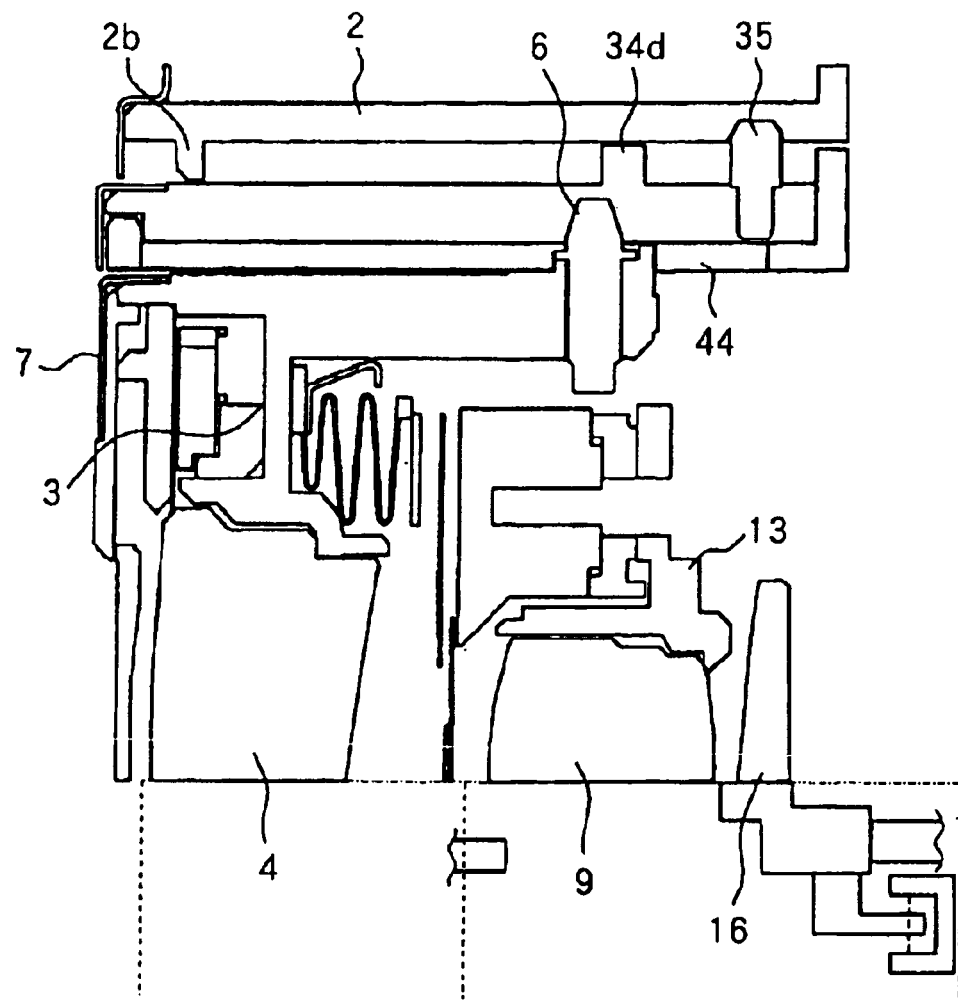
FIG. 2 is a cross-sectional view in the direction of the optical axis of the lens barrel in a collapsed state.

When the lens barrel is retracted up to the collapsed position, a slit plate 44c formed in the rectilinear guide cylinder 44 enters the slit of a photo interrupter 49, and this causes the output signal of the photo interrupter 49 to be switched (FIG. 1). A cross-sectional view in the direction of the optical axis of the lens barrel in the collapsed state is shown in FIG. 2.

The control circuit 60 performs a reset operation by detecting the switching of the output signal of the photo interrupter 49 which becomes a zoom reset, drives the lens barrel up to the collapsed position reliably, and then performs electrical termination processing and turns OFF the power.

This embodiment adopts a structure in which the movable cam ring 34 rotates around the optical axis to thereby move the view finder cam plate 46, but it is also possible to adopt a structure providing a pin which moves in the direction of the optical axis according to the protruding/retracting operation of the lens barrel and driving the view finder cam plate by the cam according to the movement of the pin. Furthermore, the view finder cam plate 46 is formed in a shape along the circumferential direction of the fixed cylinder 2, but it can also be flat-shaped.

While preferred embodiment has been described, it is to be understood that modification and variation of the present invention may be made without departing from scope of the following claims.

What is claimed is:

1. A camera comprising:
    a lens unit having a movable lens of a view finder optical system;
    a cam member having a cam which engages with the lens unit and driving the lens unit;
    a first energizing member which energizes the cam member in one of moving directions of the cam member; and
    a second energizing member which energizes the lens unit so as to contact the cam surface,
    wherein the direction of a force generated by the force of the second energizing member applied to the cam member through the contact between the lens unit and the cam surface in the moving direction of the cam member substantially matches the energizing direction of the first energizing member.

2. The camera according to claim 1,
    wherein the cam member has the cam and an other cam which engage with the lens unit other than the lens unit engaging with the cam.

3. The camera according to claim 1,
    wherein the distance between the cam and the other cam is narrowed in the energizing direction of the first energizing member, and
    the second energizing member energizes the two lens units which engage with the cam and the other cam so that the lens units are moved further away each other in the direction of the optical axis.

4. The camera according to claim 2,
    wherein the tilting of the other cam is inverted on the border between the first and second areas.

5. A camera comprising:
    a lens unit having a movable lens of a view finder optical system;
    a cam member having a cam which engages with the lens unit and driving the lens unit;
    a first energizing member which energizes the cam member in one of moving directions of the cam member; and
    a second energizing member which energizes the lens unit so as to contact the cam surface, wherein
    the distance between at least two cams is narrowed in the energizing direction of the first energizing member, and
    the second energizing member energizes the two lens units which engage with the two cams so that the lens units are moved further away from each other in the direction of the optical axis.

6. A camera comprising:
    a plurality of lens units having movable lenses of a view finder optical system;
    a cam member having a plurality of cams which engage with the lens units and driving the lens units;
    a first energizing member which energizes the cam member in one of moving direction of the cam member; and
    a second energizing member which energizes the lens units so as to contact the cam surfaces,
    wherein, the second energizing member energizes the lens units so that the lens units are moved further away from one another in the direction of the optical axis.

7. A camera comprising:
    two lens units having a movable lenses of a view finder optical system;
    a cam member having two cam which engage with the two lens units and driving the two lens units; and
    an energizing member which energizes the two lens units so as to contact the two cam surfaces,
    wherein the two cams are tilted so that the distance between the two cams widens, and the energizing member energizes the two lens units so that the lens units are moved further away from each other.

* * * * *